United States Patent (10) Patent No.: US 7,924,719 B2
Curtis et al. (45) Date of Patent: Apr. 12, 2011

(54) PARALLELIZING THE TCP BEHAVIOR OF A NETWORK CONNECTION

(75) Inventors: Bruce W. Curtis, San Ramon, CA (US); Darrin P. Johnson, Mountain View, CA (US); James P. Hughes, Palo Alto, CA (US)

(73) Assignee: Oracle America, Inc., Redwood Shores, CA (US)

( * ) Notice: Subject to any disclaimer, the term of this patent is extended or adjusted under 35 U.S.C. 154(b) by 533 days.

(21) Appl. No.: 11/869,858

(22) Filed: Oct. 10, 2007

(65) Prior Publication Data

US 2009/0097480 A1 Apr. 16, 2009

(51) Int. Cl.
*H04J 1/16* (2006.01)
(52) U.S. Cl. ..................................... 370/230.1; 370/394
(58) Field of Classification Search .................. 370/447, 370/532–545, 394, 395, 471
See application file for complete search history.

(56) References Cited

U.S. PATENT DOCUMENTS

| 5,875,192 | A | * | 2/1999 | Cam et al. | 370/395.7 |
| 5,970,067 | A | * | 10/1999 | Sathe et al. | 370/394 |
| 2004/0068575 | A1 | | 4/2004 | Cruise | |
| 2004/0093420 | A1 | * | 5/2004 | Gamble | 709/231 |
| 2005/0036519 | A1 | * | 2/2005 | Balakrishnan et al. | 370/503 |

OTHER PUBLICATIONS

Lim, Sang Boem et al., "GridFTP and Parallel TCP Support in NaradaBrokering", Distributed and Parallel Computing Lecture Notes in Computer Science; LNCS, Springer, Berlin, DE, vol. 3719, Jan. 1, 2005, pp. 93-102, XP019021375, ISBN: 978-3-540-29235-7, section 4.2.

* cited by examiner

*Primary Examiner* — Phuc Tran
(74) *Attorney, Agent, or Firm* — Park, Vaughn, Fleming & Dowler LLP; Mark Spiller (57) ABSTRACT

One embodiment of the present invention provides a system that parallelizes the TCP-related actions of a network connection between two computer systems during a data transfer between the two computer systems. During operation, the first computer system partitions the data into two or more data segments, and assigns the data segments to multiple processing elements. These multiple processing elements subsequently prepare and send their assigned data segments to the second computer system in parallel using TCP.

15 Claims, 6 Drawing Sheets

PARALLELIZING THE TCP BEHAVIOR OF A NETWORK CONNECTION

BACKGROUND

1. Field of the Invention

The present invention generally relates to computer networks. More specifically, the present invention relates to a method for parallelizing the processing of a TCP byte stream.

2. Related Art

The transmission-control protocol (TCP) is part of the core Internet protocol which is used to transfer data between computing devices. The goal of TCP is to transfer data from an application on a computing device through a network to a second device as quickly, efficiently, and reliably as possible, despite potential contention and congestion problems. While the basic operation of TCP has not changed dramatically since the initial publication of the standard in 1981, the protocol has evolved in response to changing network conditions, such as new link types (e.g., wireless networks) and higher-bandwidth wired networks.

Because TCP is a byte-stream-oriented protocol, and data packets are typically processed one packet at a time in a serial fashion, the type of computational resources that are used to process TCP packets are typically individual single-threaded central-processing units (CPUs). However, increasing network bandwidths are beginning to stretch the processing capabilities of such individual CPUs. Current trends indicate that improvements in network bandwidth will continue to outpace CPU speed improvements. Consequently, limitations in CPU capabilities for processing TCP packets may lead to an inability to fully use available network bandwidth.

Hence, what is needed is a method that enables TCP to operate without the above-described limitations.

SUMMARY

One embodiment of the present invention provides a system that parallelizes the TCP-related actions of a network connection between two computer systems during a data transfer between the two computer systems. During operation, the first computer system partitions the data into two or more data segments, and assigns the data segments to multiple processing elements. These multiple processing elements subsequently prepare and send their assigned data segments to the second computer system in parallel using TCP.

In a variation on this embodiment, partitioning the data to be transferred and sending (or receiving) the partitioned data segments in parallel using multiple processing elements does not involve any changes to TCP. Furthermore, the partitioning and parallel send (or receive) operations can be performed transparently with respect to the application layer, thereby allowing the described technique to be used without requiring any changes to existing applications.

In a variation on this embodiment, the network connection is bi-directional, and both computer systems can send data to each other at the same time using the same network connection. Both computers systems can simultaneously partition and send data segments in parallel over this bi-directional network connection. Furthermore, one or both computer systems can also simultaneously partition received data to process the received data in parallel using multiple processing elements.

In a variation on this embodiment, a computer system sends data using a send window, wherein the size of the send window can be adjusted based on one or more properties of the computer system.

In a further variation, the first computer system determines the size of the data segments based on the size of the send window and the number of available processing elements in the first computer system.

In a further variation, the first computer system determines the minimum partition size to be the larger of a virtual memory page size for the first computer system and a TCP maximum segment size.

In a further variation, the virtual memory page size for the first computer system is variable, which facilitates finer data segment sizes and thereby potentially increases the parallelization of data transfers.

In a variation on this embodiment, the multiple processing elements include two or more central-processing units that can execute independent operations in parallel.

In a variation on this embodiment, upon detecting from the received data that the first computer system is sending two or more data segments in parallel, the second system configures itself to receive the two or more data segments in parallel.

One embodiment of the present invention provides a system that parallelizes the TCP-related actions for a network connection between two computer systems. During operation, the second computer system receives TCP packets from the first computer system. Next, the second computer system partitions the received TCP packets into data segments, and then assigns the data segments to multiple processing elements. The second computer system then uses the multiple processing elements to process the data from the received TCP packets in parallel.

BRIEF DESCRIPTION OF THE FIGURES

Table 1 illustrates pseudocode for partitioning a set of data to be transmitted across a number of processing elements in accordance with an embodiment of the present invention.

Table 2 illustrates pseudocode for partitioning a set of received data across a number of processing elements in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Limitations of TCP

Figure 1:
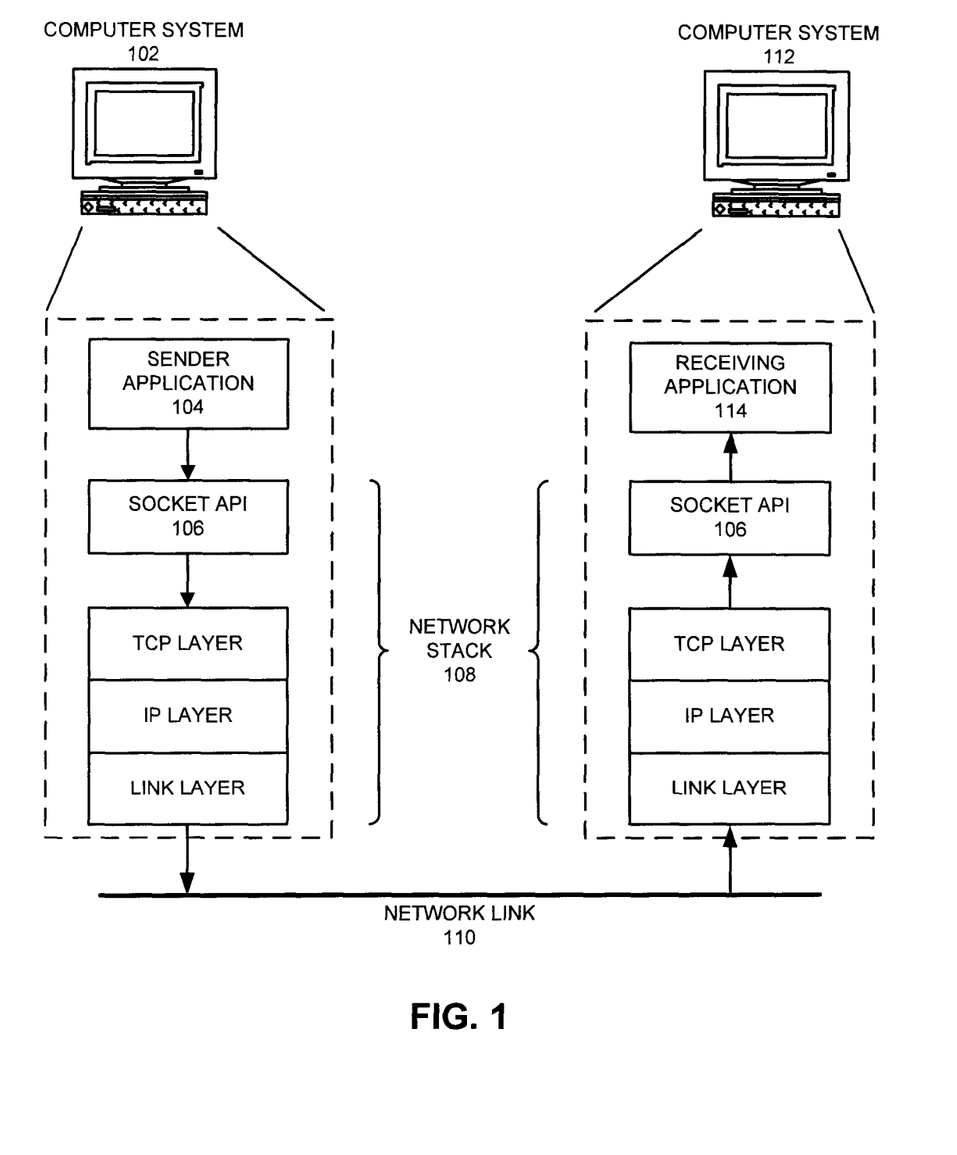
FIG. 1 illustrates two computer systems communicating over a network link in accordance with an embodiment of the present invention.

FIG. 1 illustrates two computer systems communicating over a network link 110. In FIG. 1, a sender application 104 in the sending computer system 102 uses a socket API 106 to pass data to a network stack 108, which packetizes the data and sends it over a network link 110 to a receiving computer system 112. A corresponding network stack 108 on the receiving computer system 112 processes the packets and passes them up to the receiving application 114 through socket API 106.

The TCP layer comprises an important part of the network stack 108. The core of the TCP protocol is based on a set of parameters that together determine a set of data packets, a timeframe in which they will be transmitted from the sending side, and how acknowledgements will be generated on the receiving side. The sending side constantly recalculates the set of parameters based on feedback from, for instance, acknowledgement packets and local timers, to decide which data to send or resend, and when to send or resend. The receiver side, meanwhile, decides when to generate either positive, negative, or selective acknowledgements.

TCP strives to maximize the utilization of the available network bandwidth in a "fair" manner (i.e. friendly to other TCP traffic), while avoiding, or otherwise quickly recovering from, network contention and network congestion. Achieving this goal is difficult given the wide diversity of modern networking technologies.

Byte-stream-oriented protocols such as TCP typically process one packet at a time in a serial fashion, which can limit the amount of computational resources that can be used for stream processing. As a result, depending on the design of the computer system, resources such as the CPU, the CPU bus, or the input/output (I/O) bus may become the limiting factors in processing a TCP stream. Hence, serial processing can become a bottleneck if modern network bandwidths continue to increase at a faster rate than processor speeds.

One empirical ratio suggests that a 1:1 correspondence between single-threaded throughput for a processor and link speed is necessary to saturate a link with a single connection. For instance, using this ratio, a 1 GHz CPU would be needed to saturate a single connection on a 1 gigabit (Gb) Ethernet link. Following this empirical ratio, saturating a 10 Gb or 100 Gb network link requires CPUs with frequencies on the order of 10 GHz and 100 GHz, respectively. Modern CPU designs often include multiple computing elements (or cores) instead of dramatically increasing CPU frequency, and achieving the high CPU frequencies needed to saturate such these network bandwidths may not be feasible and/or practical in the timeframe that these bandwidth advances become available.

Note that multi-processor systems may still be able to achieve link saturation. For instance, a system with a network stack that allows a 2× parallelization may still be able to saturate a 10 Gb network link using 4 CPUs and 2 connections. However, because some applications require a single connection, and such multi-processor systems are limited in their peak single-threaded performance, processor performance may still limit a system's ability to fully-utilize high-bandwidth network links.

In one embodiment of the present invention, the system partitions and parallelizes TCP data processing operations so that multiple computing elements can process a single TCP connection's byte stream, thereby increasing per-connection throughput.

Partitioned Parallel Processing for TCP

While network protocol stacks are typically optimized for sequential processing of TCP packets, a property of TCP that is intended for handling packet loss allows TCP packets to arrive out of order on the receiving side of a network connection. This property facilitates sending multiple TCP packets in parallel, out of order.

For example, in one embodiment of the present invention, suppose a first computer system receives a request to transfer data over a network connection to a second computer system. In response to this request, the first computer system partitions the data into two or more data segments, and then assigns the data segments to multiple processing elements (on the first computer system). These multiple processing elements subsequently prepare and send their assigned data segments to the second computer system in parallel using TCP.

Figure 2:
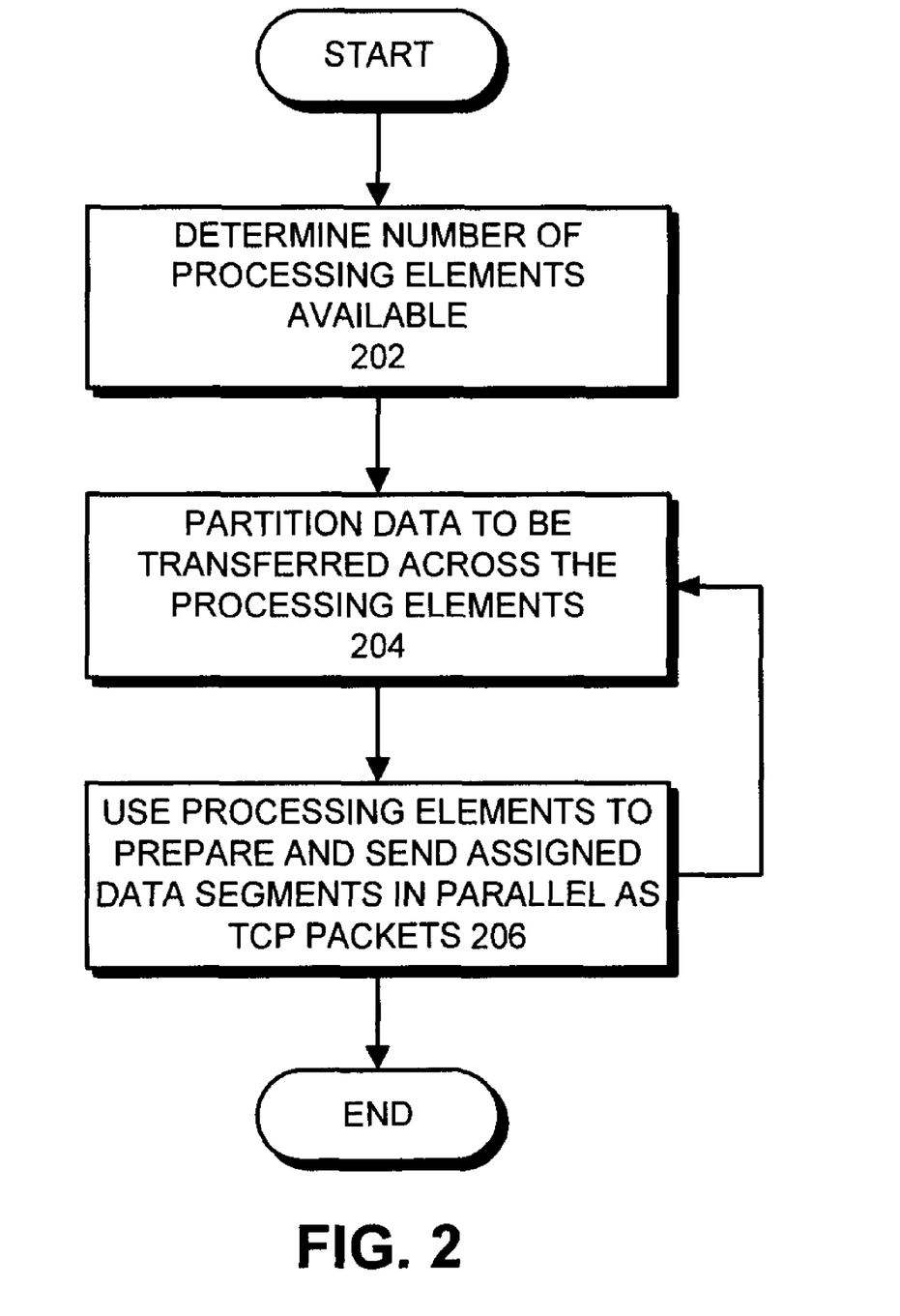
FIG. 2 presents a flow chart illustrating the process of parallelizing a TCP transmission for a set of data in accordance with an embodiment of the present invention.

FIG. 2 presents a flow chart illustrating the process of parallelizing a TCP send operation for a set of data. During a data transfer, the sending computer system determines the number of processing elements available (operation 202), and proceeds to partition the data to be transferred across the available processing elements (operation 204). The sending computer system then uses the available processing elements to prepare and send the assigned data segments in parallel using TCP (operation 206).

The TCP protocol facilitates limiting the amount of unacknowledged bytes that a sending system can send to a receiving system by using a "send window" of a specified size. If, after sending a number of bytes equal to the size of the send window, the sender has not received acknowledgements for the data packets, the sender may wait for such acknowledgement before sending further data. This ensures that the receiver or any intermediate nodes are not overwhelmed by the data sent. Note that the send window for a connection can change over time, for instance depending on packet loss, network congestion, and receiver feedback.

In one embodiment of the present invention, the sending system considers the number of available processing elements and the size of the send window when partitioning the data to be transferred. Because the send window may limit the amount of data that can be sent in a given time interval, the sending system may repeat the partition and process operations multiple times, as shown by the loop (between operation 206 and operation 204) in FIG. 2. For instance, the sending system may repeatedly partition and process a send-window-sized amount of data from the data stream. The sending system may also consider other parameters when choosing the size of partitions, for example determining the minimum partition size to be the larger of a virtual memory page size and a TCP maximum segment size. Note that a system with variable page sizes may be able to tune the page size to partition data into a larger number of smaller partitions. This makes it possible to take advantage of a larger number of processing elements to increase parallelization.

For example, Table 1 illustrates pseudocode for partitioning a set of data across N processing elements in a system with an 8 kilobyte (KB) page size and a send window with a size of N*8K. The system first partitions successive 8 KB segments of data to the N processing elements, which then process and transmit the packets for their respective data segments. The system then waits until all of the data in the current partitions has been sent, and proceeds to partition and process the next N*8 KB bytes, until all of the data has been transferred. Note that additional checks may occur during this process, for instance to ensure that the system does not exceed the limits of the send window.

TABLE 1

```
          Send_Seq = 0;
AGAIN:    Avail_Partitions = N;
          Send_Window = N * 8KB;
          While ((Avail_Partitions > 0) && (Send_Window > 0)){
              Bytes = (8KB <= Send_Window) ? 8KB : Send_Window;
              Partitions[Avail_Partitions] = Send_Seq, Bytes;
              Process_and_Send(Avail_paritions);
              Avail_Partitions--;
              Send_Seq += Bytes;
              Send_Window -= Bytes;
          }
          Wait (Partitions_All_Done);
          If (!End_of_Stream)
              Goto Again;
          Exit;
}
```

Figure 3:
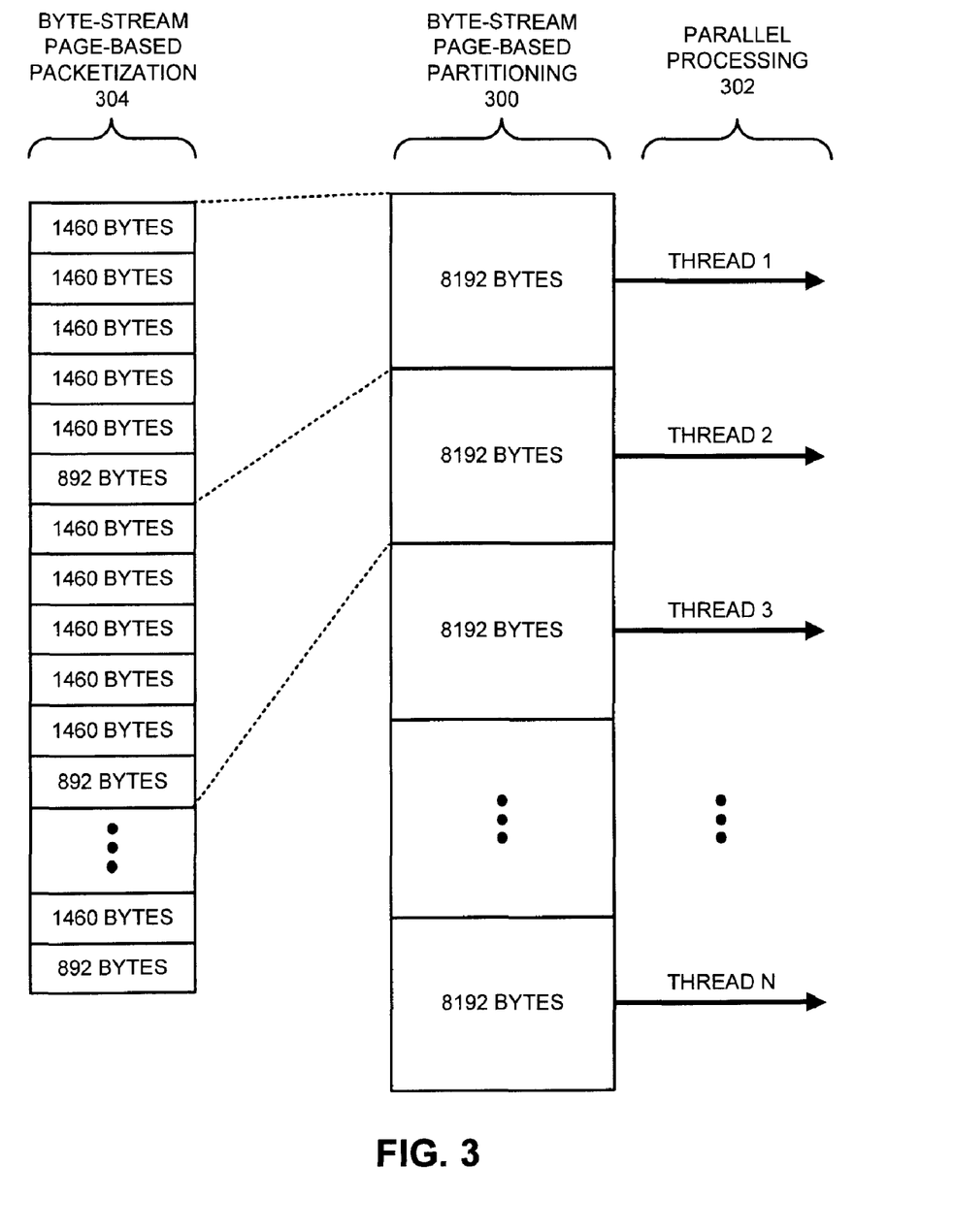
FIG. 3 illustrates a sending system which is partitioning and processing a TCP byte stream in accordance with an embodiment of the present invention.

FIG. 3 illustrates the sender-side partitioning described in the example from the previous paragraph, in a system with an 8 KB page size and for a maximum TCP packet size of 1460 bytes. During this process, the system performs a page-based partitioning 300 for the byte stream, and hands off pages of data to a set of threads for parallel processing 302. Each thread then processes an assigned page to create a page-based packetization 304 for its portion of the byte stream which results in five 1460 byte packets and one 892 byte packet that are sent over the network connection to the receiving system.

Figure 4:
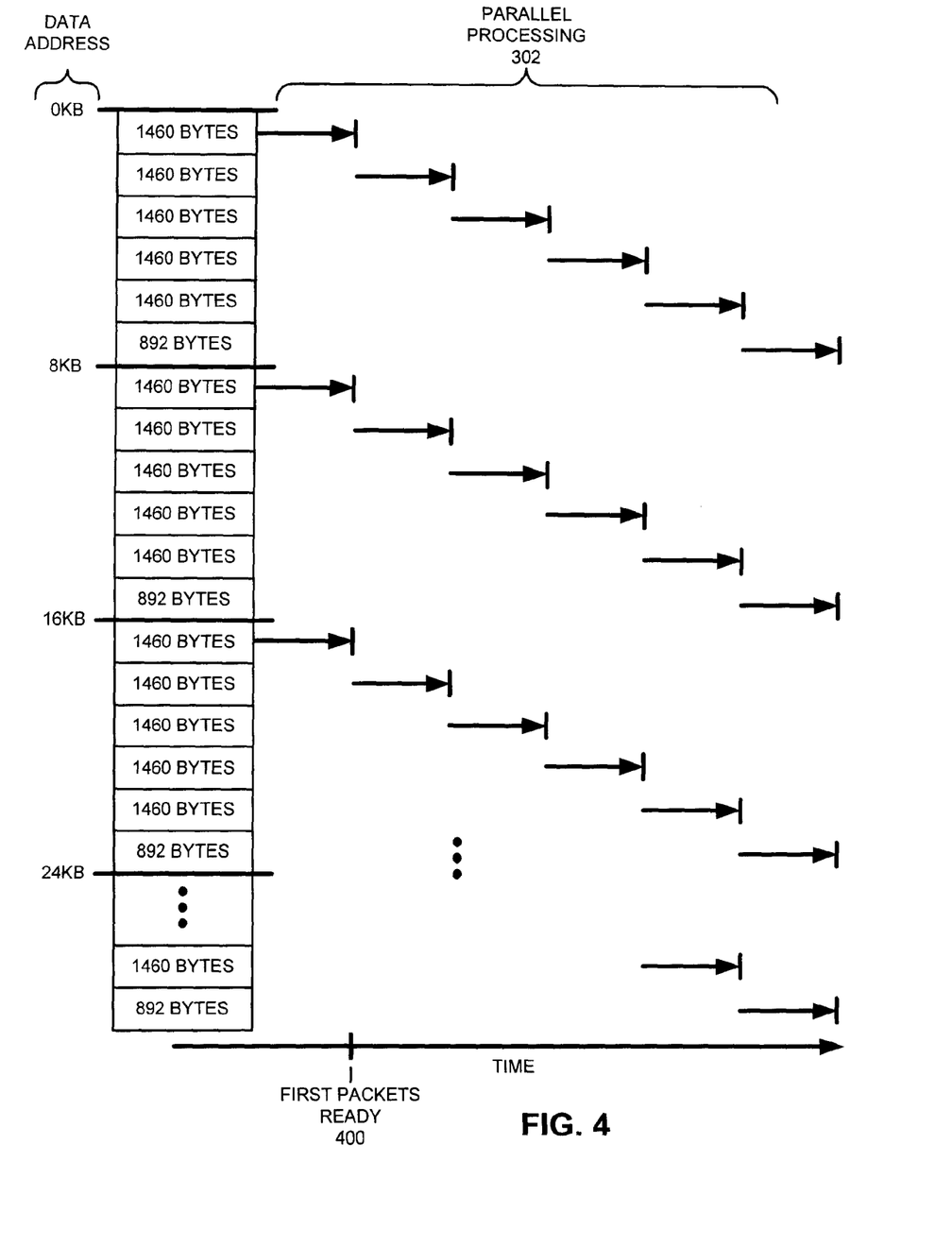
FIG. 4 illustrates the parallel processing of packets in a TCP byte stream in accordance with an embodiment of the present invention.

A number of independent, asynchronous processing elements that process N partitions in parallel are likely to send packets out of order (from the perspective of the contiguous data block), as illustrated in FIG. 4. For instance, the first packet from each of the first N pages may be ready at the same time 400. Note that while the processing elements may complete the TCP processing for a set of packets in parallel at the same time (e.g., at time 400), other parts of the system may pipeline other lower-level operations at line speed. For example, these lower-level operations may involve: processing internet protocol (IP) headers for the packets; assigning transmit descriptors to the packets in the device driver; and queuing the packets for a given link. Note also that the system may partition and send data from one or more data streams in parallel using two or more network connections.

Techniques substantially similar to those described for parallel data transmission can also be used to process the data received on a computer system in parallel. In one embodiment of the present invention, a receiving computer system receives data from a sending computer system. The receiving system accepts the data at the line speed of the link, and partitions the incoming TCP packets into data segments. The receiving system then assigns these data segments to multiple processing elements, which process the data from the data segments in parallel. When all the packets for each contiguous data segment have been received and processed, the system sends the processed data up to the next layer in the network protocol stack.

Figure 5:
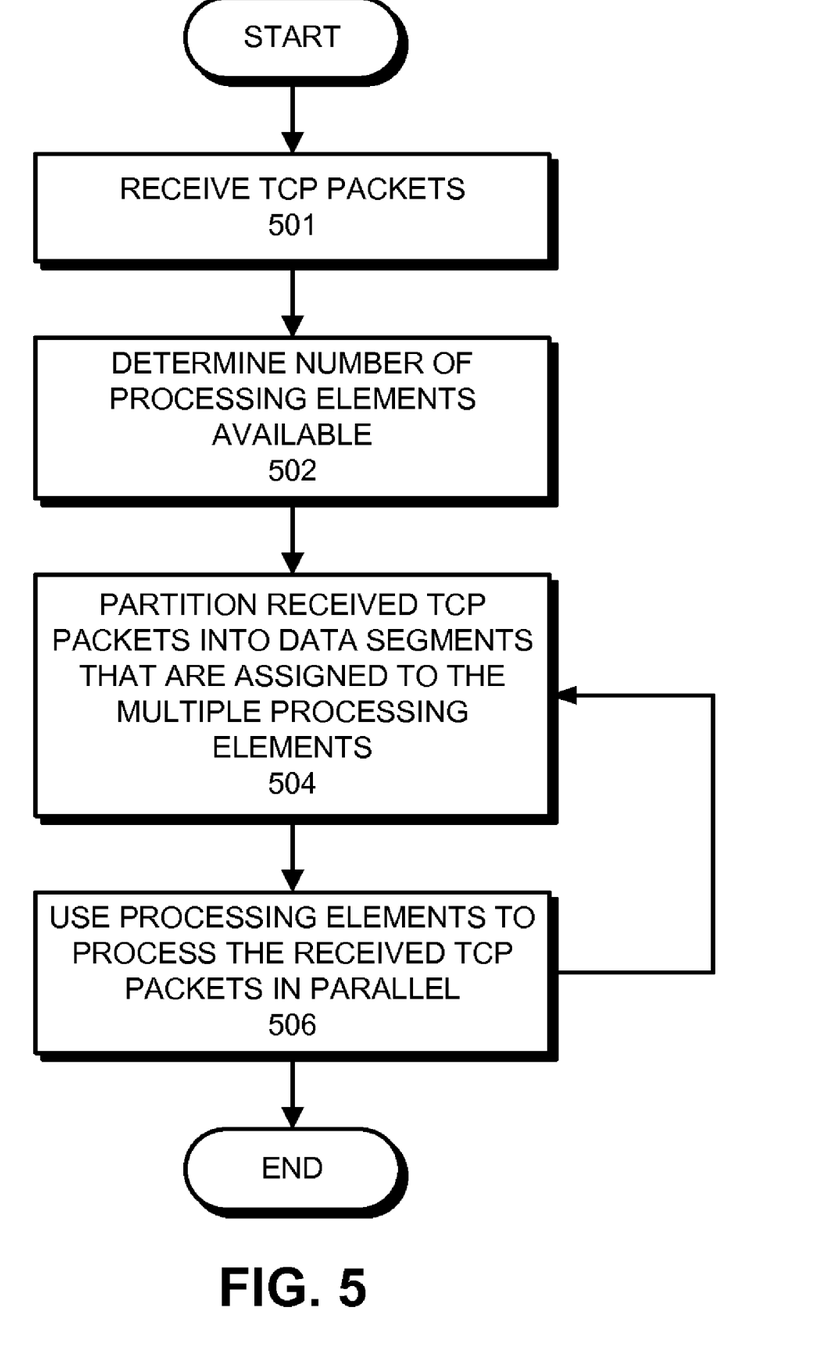
FIG. 5 presents a flow chart illustrating the process of parallelizing received TCP packets in accordance with an embodiment of the present invention.

FIG. 5 presents a flow chart illustrating the process of parallelizing a TCP receive operation. During a data transfer, the receiving computer system receives one or more TCP packets (operation 501), determines the number of processing elements available for processing TCP data (operation 502), and proceeds to partition and assign the received data to the available processing elements (operation 504). The receiving computer system then uses the available processing elements to process the received TCP packets in parallel (operation 506). The system may repeat the partition and process operations multiple times (as shown in FIG. 5), e.g., depending on the number of available processing elements and the size of the data to be transferred. After all of the packets for a partition have been received, the system can send the TCP payload data up to the next layer of the network protocol stack.

Table 2 illustrates pseudocode for partitioning a set of received data across N processing elements in a system with an 8 KB page size and a send window with a size of N*8 KB. During the partitioning, the system partitions successive 8 KB segments of received data between the N processing elements, which then process the TCP packets for their respective data segments. The system then waits until all of the current partitions have been processed, and proceeds to partition and process the next N*8 KB bytes. This process is repeated as necessary until all of the data has been transferred.

TABLE 2

```
          Recv_Seq = 0;
AGAIN:    Avail_Partitions = N;
          While (Avail_Partitions > 0){
              Wait (New_Seq);
              Partitions[Avail_Partitions] = Recv_Seq, 8KB;
              Avail_Partitions--;
              Recv_Seq += 8KB;
          }
          Wait (Partitions_All_Done)
          If (!End_of_Stream)
              Goto Again;
          Exit;
}
```

Figure 6:
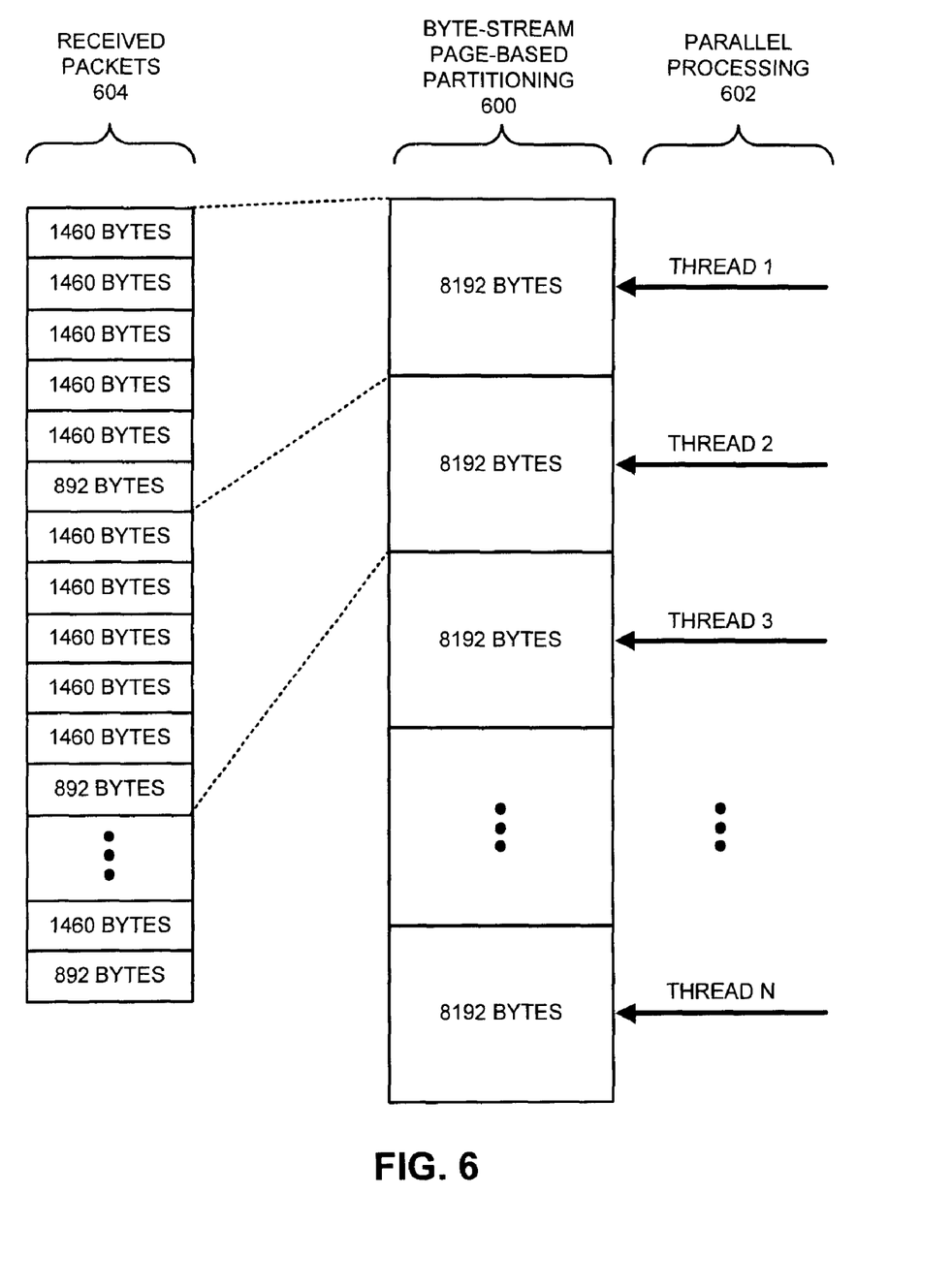
FIG. 6 illustrates a receiving system partitioning and processing a TCP byte stream in accordance with an embodiment of the present invention.

FIG. 6 illustrates the receiver-side partitioning described in the previous paragraph, for a system with an 8 KB page size and for a maximum TCP packet size of 1460 bytes. During this process the system performs a page-based partitioning 600 for the incoming byte stream, and then hands off incoming data packets to a set of threads for parallel processing 602. Each thread then processes the received packets 604 that correspond to its assigned page, which (in this example) include five 1460 byte packets and one 892 byte packet. Note that the receiving system may adjust the number of packets assigned to each processing element to ensure that the resulting data fits into the specified page size.

In one embodiment of the present invention, a receiving computer system can detect from the order of packets received for a connection that a sending computer system is sending two or more data segments in parallel. In response, the receiving computer system can configure itself to receive the two or more data segments in parallel. For instance, based on the number of sequence numbers for the packets received, the receiving system may be able to determine the number of processing elements used to parallelize the data stream on the sending system, and can choose to allocate a substantially similar number of processing elements to process the receive operation in parallel. Note that the sending and receiving computer systems do not both have to parallelize TCP operations. Depending on the resources available on each system, one, both, or none of these systems may decide to parallelize operations over multiple processing elements.

In one embodiment of the present invention, two computer systems involved in data transfers with each other can both simultaneously parallelize both their send and/or receive processing. For instance, if both computer systems simultaneously send data to each other using a bi-directional network connection, both computer systems can (individually) use multiple processing elements to partition and send data segments in parallel over the bi-directional network connection. At the same time, one or both computer systems can also simultaneously partition the received data and then process the received data in parallel using multiple processing elements. The level of parallelization may be dynamically and independently determined by each computer system, for instance depending on: the number of processing elements available, the size of the data transfers, and/or network conditions.

In one embodiment of the present invention, the described techniques allow data to be sent and/or received in parallel using multiple processing elements without changing TCP. The data partitioning and parallel send/receive operations can also be performed transparently with respect to the application layer, thereby allowing the described techniques to be used without requiring any change to existing applications.

In one embodiment of the present invention, the described techniques may also be enhanced by minor changes to TCP. For instance, TCP includes mechanisms for detecting and requesting retransmission of lost packets. A retransmit timer on the sending system can detect whether a packet was acknowledged as received by the receiving system. Also, the receiving system can indicate to the sending system that packets have not been received (e.g., by indicating the next packet sequence number the receiving system expects to receive). Note that because the sending system may deliberately send packets out of order, there may be issues in typical TCP network stacks with out-of-order segments causing a receiving system to make invalid retransmission requests. In this situation, the receiver's network stack may be modified, so that only a retransmit timer is used to retransmit lost packets. Given a send window of sufficient size for the connection, the packets sent (in parallel) by the sending system appear to the receiver as packets that arrive out-of-order, but in a timely fashion, so the retransmit timers for packets are not triggered.

In summary, one embodiment of the present invention solves the problem of network physical link layer throughput being faster than the throughput of any single execution unit in a system, by partitioning TCP data streams to facilitate parallel processing. In this way, additional processing elements can be leveraged to ensure that the full capacity of a link is used.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for parallelizing the transmission-control protocol (TCP)-related actions of a network connection, wherein the network connection facilitates communication between a first computer system and a second computer system during a data transfer between the first computer system and the second computer system, and wherein the first computer system includes a send window that is used to control the transmission of data on the network connection, wherein a size of the send window can be adjusted based on one or more properties of the first computer system, comprising:

partitioning the data to be transferred into two or more data segments on the first computer system, wherein a size of the data segments is determined based on the size of the send window and a number of available processing elements in the first computer system;

assigning the data segments to multiple processing elements within the first computer system; and using the multiple processing elements to prepare and send their assigned data segments over the network connection to the second computer system in parallel using TCP;

wherein the network connection comprises a single physical network link.

2. The method of claim 1, wherein partitioning the data to be transferred and sending the partitioned data segments in parallel using the multiple processing elements does not involve changing TCP; and wherein partitioning the data to be transferred and sending the partitioned data segments in parallel using the multiple processing elements is transparent to the application layer.

3. The method of claim 1, wherein the network connection is bi-directional;

wherein the second computer system sends data to the first computer system in the same timeframe that the first computer system sends data to the second computer system;

wherein the first computer system and the second computer system can both simultaneously partition and send data segments to each other in parallel over the bi-directional network connection; and wherein one or both of the first computer system and the second computer system can partition received data and process the received, partitioned data in parallel using the multiple processing units.

4. The method of claim 1, wherein the minimum partition size is the larger of:

a virtual memory page size for the first computer system; and a TCP maximum segment size.

5. The method of claim 4, wherein the virtual memory page size for the first computer system is variable, which facilitates finer data segment sizes and thereby potentially increases the parallelization of data transfers.

6. The method of claim 1, wherein the multiple processing elements include two or more central-processing units that can execute independent operations in parallel.

7. The method of claim 1 wherein, upon detecting from the received data that the first computer system is sending two or more data segments in parallel, the second computer system configures itself to receive the two or more segments in parallel.

8. A method for parallelizing the TCP-related actions of a network connection, wherein the network connection facilitates communication between a first computer system and a second computer system, and wherein the first computer system includes a send window that is used to control the transmission of data on the network connection, wherein a size of the send window can be adjusted based on one or more properties of the first computer system, comprising:

receiving TCP packets sent over the network connection from the first computer system on the second computer system, wherein a size of a data segment in each TCP packet is determined based on the size of the send window and a number of available processing elements in the first computer system;

partitioning the received TCP packets into data segments;

assigning the received data segments to multiple processing elements on the second computer system; and using the multiple processing elements to process the data from the received TCP packets in parallel;

wherein the network connection comprises a single physical network link.

9. A non-transitory computer-readable storage medium storing instructions that when executed by a computer cause the computer to perform a method for parallelizing the TCP-related actions of a network connection, wherein the network connection facilitates communication between a first computer system and a second computer system during a data transfer between the first computer system and the second computer system, and wherein the first computer system includes a send window that is used to control the transmission of data on the network connection, wherein a size of the send window can be adjusted based on one or more properties of the first computer system, the method comprising:

partitioning the data to be transferred into two or more data segments on the first computer system, wherein a size of the data segments is determined based on the size of the send window and a number of available processing elements in the first computer system;

assigning the data segments to multiple processing elements within the first computer system; and using the multiple processing elements to prepare and send their assigned data segments over the network connection to the second computer system in parallel using TCP;

wherein the network connection comprises a single physical network link.

10. The non-transitory computer-readable storage medium of claim 9, wherein partitioning the data to be transferred and sending the partitioned data segments in parallel using the multiple processing elements does not involve changing TCP; and wherein partitioning the data to be transferred and sending the partitioned data segments in parallel using the multiple processing elements is transparent to the application layer.

11. The non-transitory computer-readable storage medium of claim 9, wherein the network connection is bi-directional;

wherein the second computer system sends data to the first computer system in the same timeframe that the first computer system sends data to the second computer system;

wherein the first computer system and the second computer system can both simultaneously partition and send data segments to each other in parallel over the bi-directional network connection; and wherein one or both of the first computer system and the second computer system can partition received data and process the received, partitioned data in parallel using the multiple processing units.

12. The non-transitory computer-readable storage medium of claim 9, wherein the minimum partition size is the larger of:

a virtual memory page size for the first computer system; and a TCP maximum segment size.

13. The non-transitory computer-readable storage medium of claim 12, wherein the virtual memory page size for the first computer system is variable, which facilitates finer data segment sizes and thereby potentially increases the parallelization of data transfers.

14. An apparatus that parallelizes TCP-related actions of a network connection, wherein the network connection facilitates communication between a first computer system and a second computer system during a data transfer between the first computer system and the second computer system, and wherein the first computer system includes a send window that is used to control the transmission of data on the network connection, wherein a size of the send window can be adjusted based on one or more properties of the first computer system, comprising:

a partitioning mechanism configured to partition the data to be transferred into two or more data segments on the first computer system, wherein the partitioning mechanism is configured to determine a size of the data segments based on the size of the send window and a number of available processing elements in the first computer system; and an assigning mechanism configured to assign the data segments to multiple processing elements within the first computer system;

wherein the multiple processing elements are configured to prepare and send their assigned data segments over the network connection to the second computer system in parallel using TCP; and wherein the network connection comprises a single physical network link.

15. The method of claim 1, wherein the data segments sent by the multiple processing elements are sent in parallel using a single TCP connection.

* * * * *